United States Patent [19]

Pitkanen

[11] Patent Number: 5,454,576
[45] Date of Patent: Oct. 3, 1995

[54] FOLDABLE TWO-WHEELED GOLF PULL CART

[76] Inventor: Alan R. Pitkanen, 3120 Ocean Dr., Manhattan Beach, Calif. 90266

[21] Appl. No.: 323,543

[22] Filed: Oct. 17, 1994

[51] Int. Cl.⁶ ........................................................ B62B 1/12
[52] U.S. Cl. .............................. 280/42; 280/645; 280/652; 280/47.26; 280/DIG. 6
[58] Field of Search ................................. 280/38, 39, 40, 280/641, 645, 42, 651, 652, 655, 47.18, 47.24, 47.20, 47.315, DIG. 5, DIG. 6

[56] References Cited

U.S. PATENT DOCUMENTS

| | | | |
|---|---|---|---|
| 4,062,564 | 12/1977 | Schimmeger | 280/DIG. 6 |
| 4,792,152 | 12/1988 | Carolan | 280/DIG. 6 |
| 5,112,068 | 5/1992 | Liao et al. | 280/DIG. 6 |

FOREIGN PATENT DOCUMENTS

| | | | |
|---|---|---|---|
| 207045 | 3/1957 | Australia | 280/DIG. 6 |
| 469642 | 11/1950 | Canada . | |

*Primary Examiner*—Richard M. Camby

[57] ABSTRACT

A foldable two-wheeled golf pull cart for use in conjunction with a conventional golf bag or which may be formed integral with a specially-designed golf bag. The pull cart of the invention is constructed so that its wheels may be collapsed individually and sequentially to a stowed position directly under the bottom of the golf bag one over the other and parallel to the bottom of the golf bag in coaxial relationship with the longitudinal axis of the golf bag. Each wheel is connected by a strut to a hinge on the frame of the golf pull cart and each wheel may be swung easily to its deployed position by a 180 degree rotation about a corresponding single axis.

12 Claims, 5 Drawing Sheets

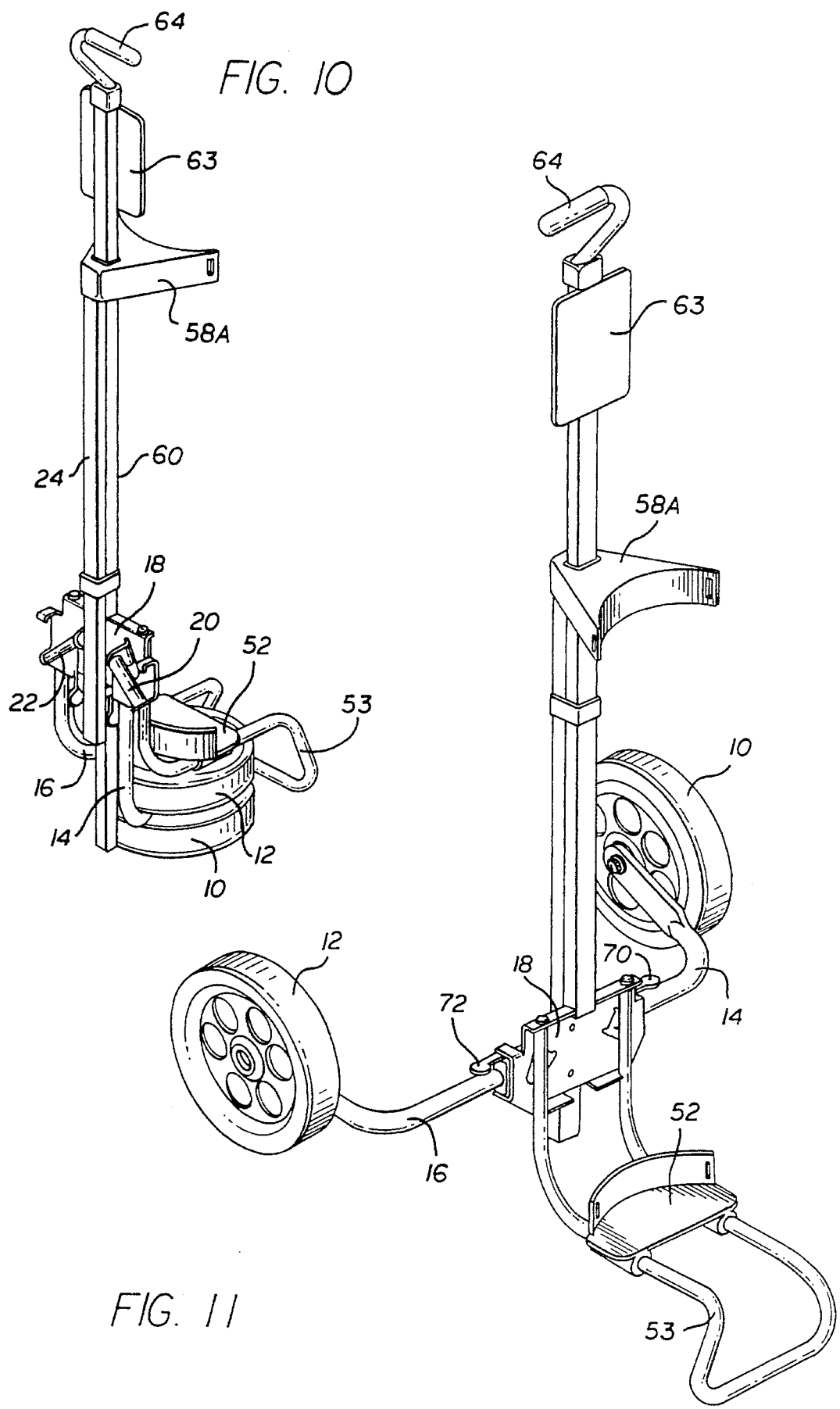

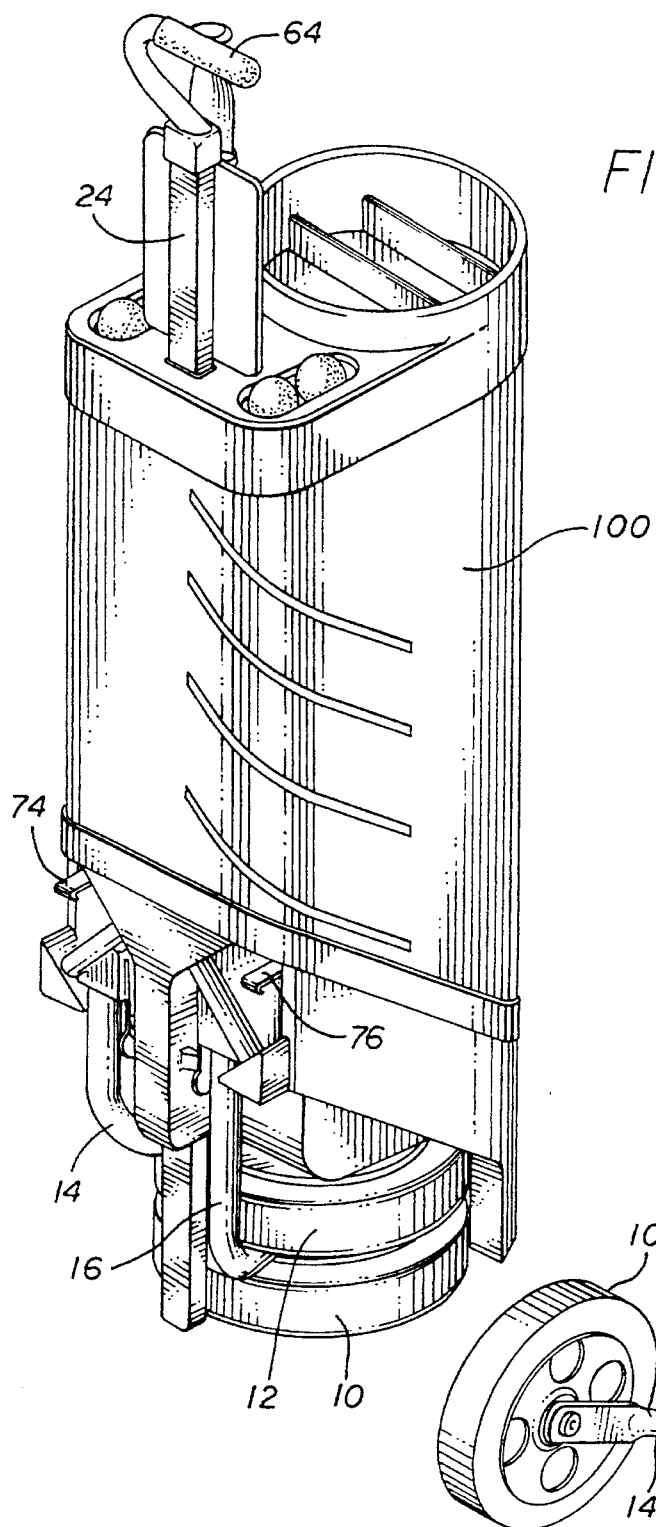
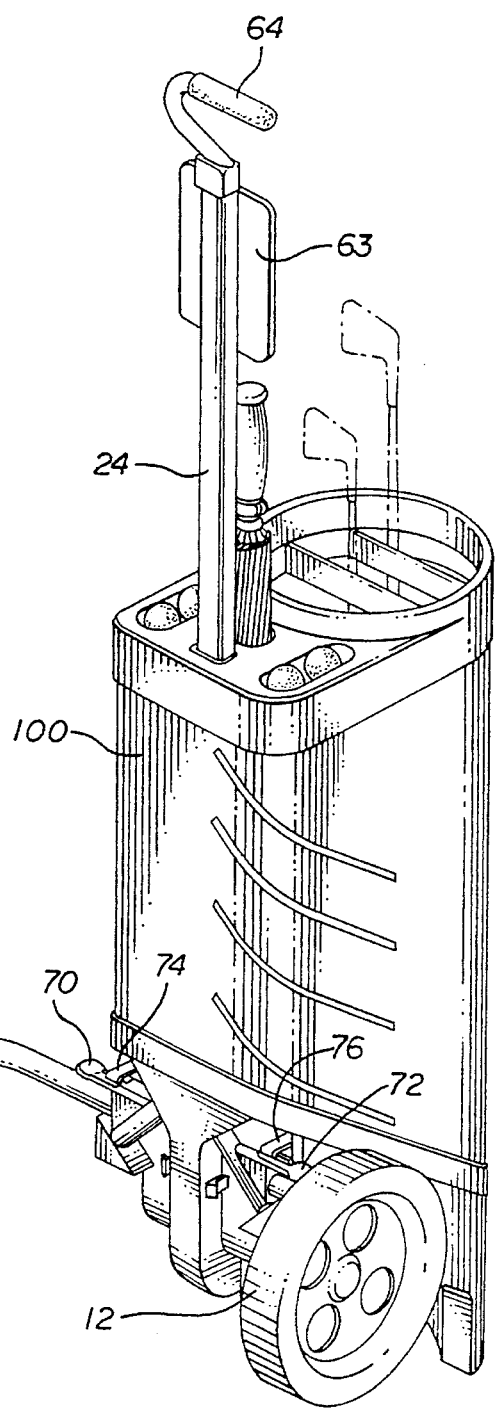
FIG. 12
FIG. 13

FOLDABLE TWO-WHEELED GOLF PULL CART

BACKGROUND OF THE INVENTION

The invention relates to an improved foldable two-wheeled pull cart for a conventional golf bag, or which may be formed integral with a specially-designed golf bag.

Two-wheeled foldable golf pull carts are well known to the art. The wheel mechanisms in the prior art foldable pull carts traditionally collapse from their deployed, spread-apart operating position toward the golf bag with the wheels remaining parallel to their deployed position. There are several disadvantages to the prior art pull carts. One disadvantage is that the golf bag and pull cart, when the pull cart is collapsed, become bottom-heavy and make lifting and carrying cumbersome. Moreover, the usual prior art pull carts when collapsed create a bulky package which makes it difficult to store, to place in the trunk of a car, to put in a motorized golf cart, or to take on an airplane, etc.

Attempts have been made in the prior art to devise foldable golf pull carts which overcome the disadvantages described in the preceding paragraph. For example, foldable golf pull carts have been conceived in the past which are designed to be built into a specially-constructed golf bag, or to be built as a separate cart for carrying a conventional golf bag, and in which the wheels may be collapsed into a more compact unit as compared with the conventional prior art pull cart. However, for the most part, such pull carts are complex in their construction, and are heavy and difficult to operate.

An objective of the present invention is to provide an improved, simplified, foldable golf pull cart which is constructed so that the wheels are collapsed to a position one over the other directly beneath the golf bag and in coaxial relationship with the longitudinal axis of the golf bag. The mechanism of the invention is inherently simple, since the wheels may be swung easily to their deployed and to their folded positions, and since it entails a minimum of struts or other linkage mechanisms.

A more specific objective of the invention is to create a pull cart which forms a significantly more compact package when collapsed, as compared with the prior art structures.

Another objective of the invention is to provide such an improved golf pull cart which is light in weight, simple and sturdy in its construction, and which is relatively inexpensive to manufacture.

Yet another objective of the invention is to provide a unique golf pull cart, as described above, which permits the golf bag to stand upright on its end when the wheels are folded, and to be easily carried by its shoulder strap.

BRIEF DESCRIPTION OF THE DRAWINGS

FIG. 10 is a perspective view of a somewhat simpler construction for the golf pull cart of the invention, as represented by a second embodiment, and with the wheels in their collapsed position;

FIG. 11 is another perspective view of the second embodiment, and showing the wheels in their deployed position;

FIG. 12 represents a third embodiment in which the pull cart of the invention is formed integral with a specially-designed golf bag, this view showing the wheels in their folded position extending under and into the base of the bag; and FIG. 13 is another perspective view of the embodiment of FIG. 12, and showing the wheels in their deployed operating position.

DETAILED DESCRIPTION OF THE ILLUSTRATED EMBODIMENTS

Figure 1:
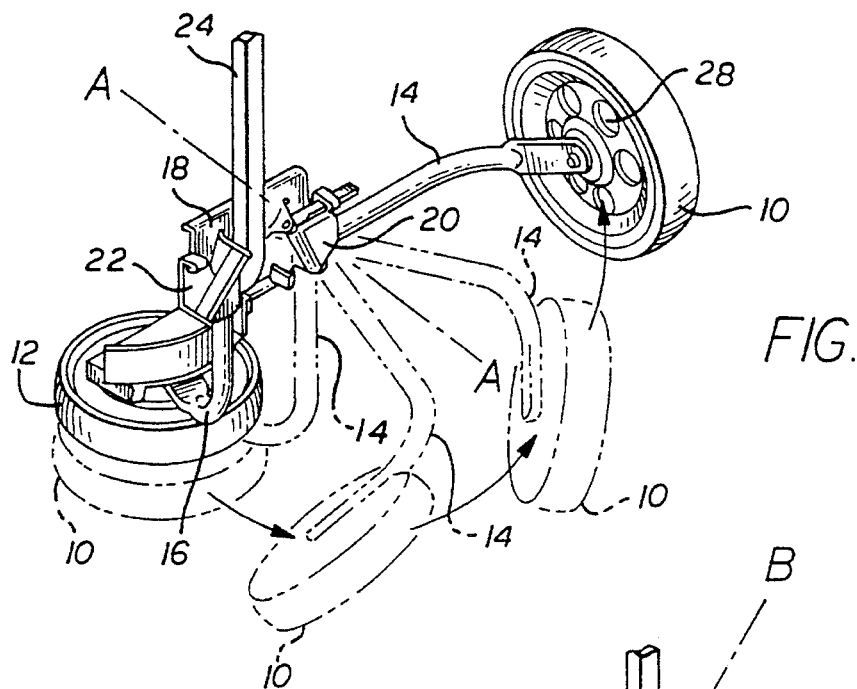
FIGS. 1–3 are schematic diagrams showing the operating mechanism of the foldable two-wheeled golf pull cart of the invention, and showing how each of the wheels may be deployed from their folded position (FIGS. 1 and 2) to their spread-apart position (FIG. 3)
Figure 2:
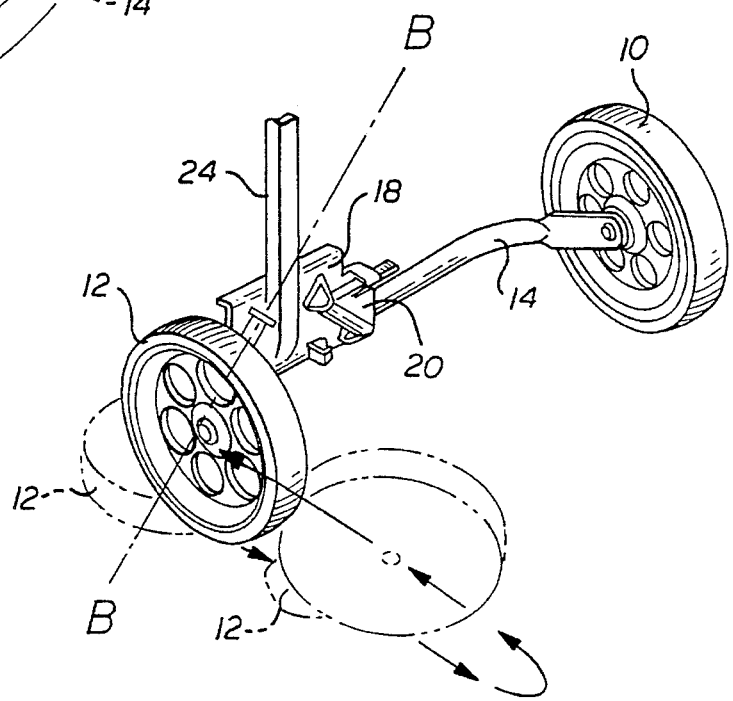
Figure 3:
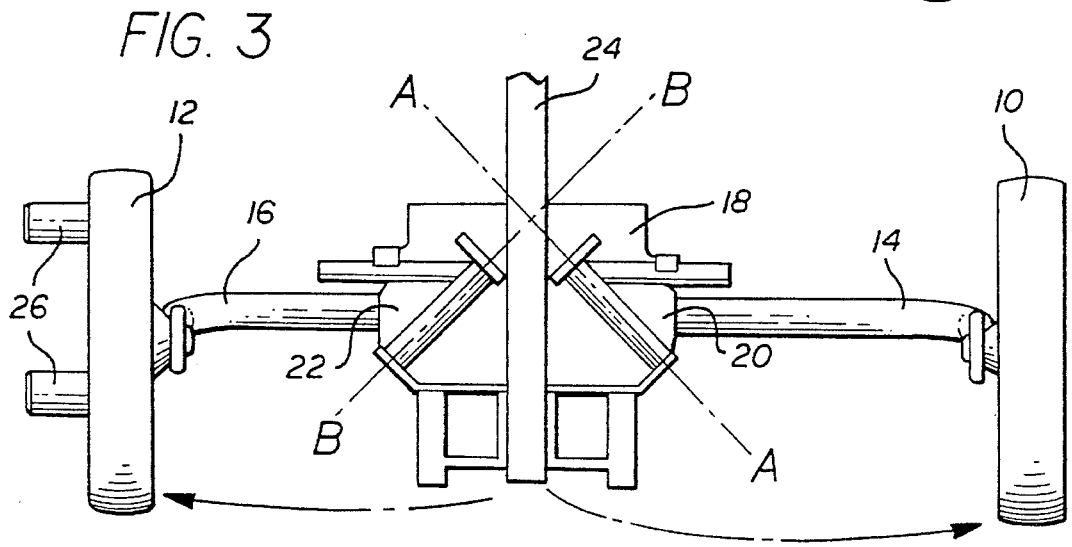

The action of the mechanism of the invention is illustrated in the kinetic representations of the schematic diagrams of FIGS. 1–3. These representations show the manner in which the two wheels 10 and 12 of the pull cart are moved from their folded position (FIGS. 1 and 2) to their deployed spread-apart position (FIG. 3). The two wheels are rotatably mounted on respective struts 14 and 16, and the struts in turn are hinged to a bracket 18 by respective hinges 20 and 22. Bracket 18 is secured to the lower end of a post 24 which constitutes the frame of the pull cart.

Figure 4:
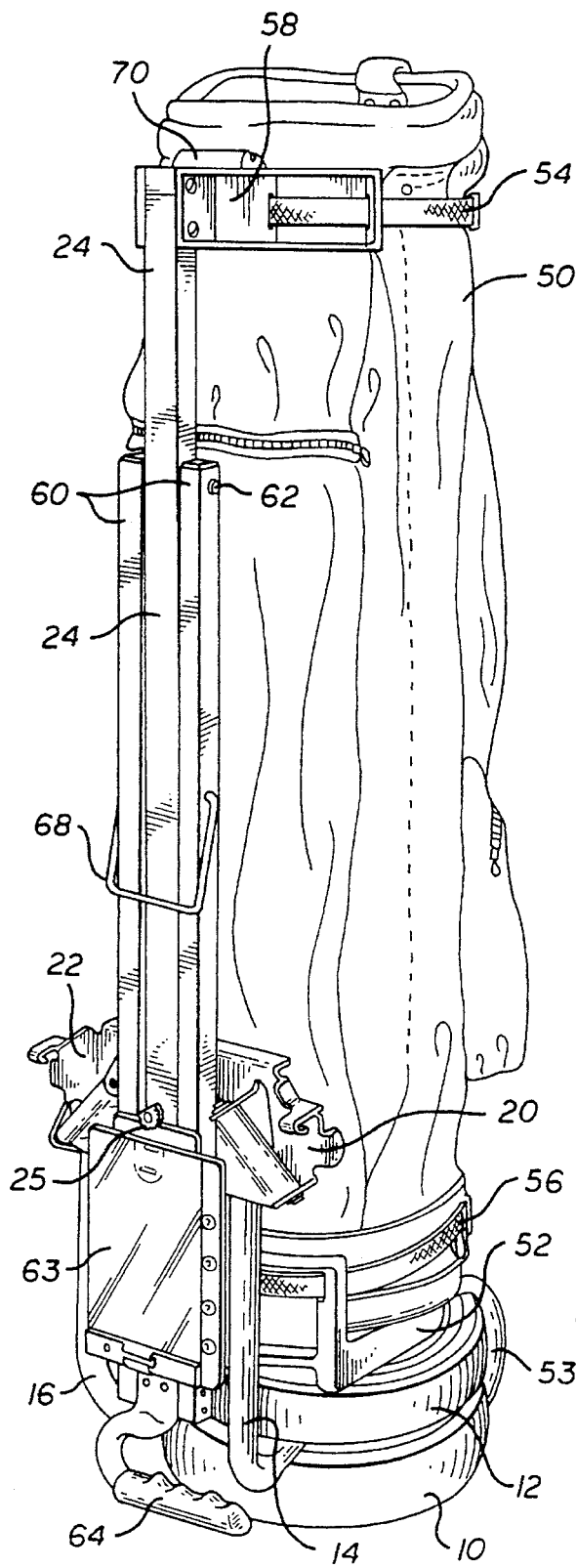
FIG. 4 is a perspective representation of the golf pull cart of the invention in one of its embodiments, supporting a golf bag, and with the wheels of the pull cart in their folded position underneath the bag in axial alignment with the bag.

In their folded position, wheels 10 and 12 are located directly under the golf bag 50 carried by the pull cart in coaxial relationship with the longitudinal axis thereof, as best shown in FIG. 4. The wheels are axially displaced from one another when in their folded position by axial posts 26 secured to wheel 12 at selected angular positions around the wheel, as shown in FIG. 3.

When the wheels 10 and 12 are moved to their deployed position of FIG. 3, wheel 10 first travels along the path shown in FIG. 1 due to the action of hinge 20, as the strut 14 is rotated about axis A-A. Then wheel 12 is caused to follow the path shown in FIG. 2 as its strut 16 is rotated about axis B-B due to the action of hinge 22. Thus, each strut is caused to rotate 180 degrees about a corresponding single pivot axis A-A, B-B by the hinges 20 and 22, as the wheels are individually moved from their folded, stowed position to their deployed, operating position.

Figure 5:
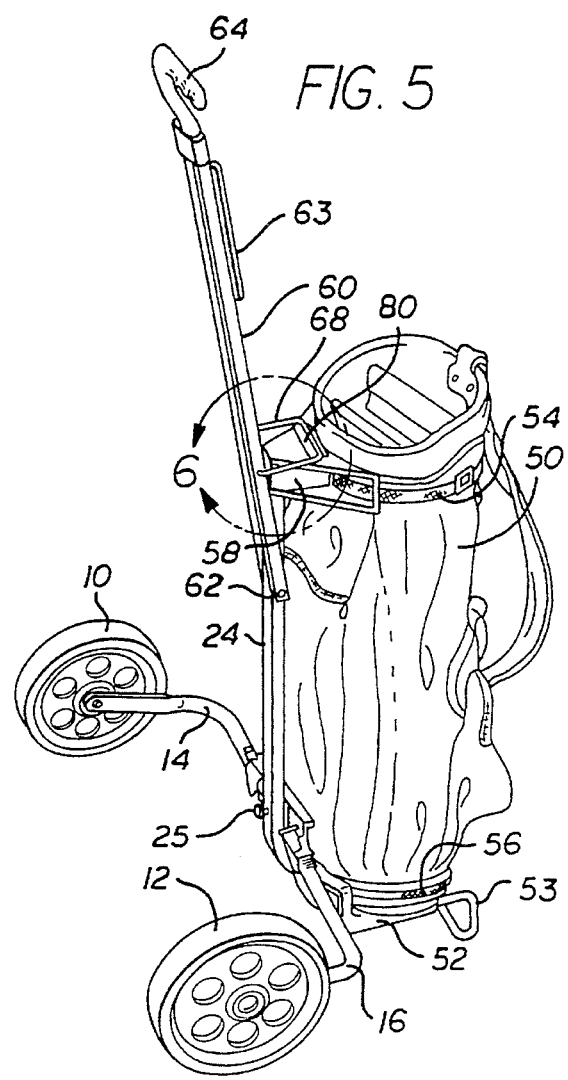
FIG. 5 is a perspective view of the golf pull cart of the first embodiment supporting a golf bag, and with its wheels in a deployed operating position.

The first embodiment of the invention is shown in FIGS. 4–9. As shown in FIGS. 4 and 5, a conventional golf bag 50 is supported on an appropriate bottom platform 52 which is secured to the frame post 24. A U-shaped foot member 53 is secured to platform 52, and it depends downwardly from the platform to permit the pull cart to be supported in a stable upright position when in use, as shown in FIG. 5. The golf bag 50 is held in place on the pull cart by an upper strap 54 and by a lower strap 56. Strap 54 extends through an upper bracket 58 which is secured to the upper end of frame post 24, and strap 56 extends through slots in platform 52.

When the wheels 10 and 12 are moved to their folded position shown in FIG. 4, they are stowed under the platform 52 in coaxial relationship with the longitudinal axis of bag 50. An elongated handle 60 is pivotally mounted on the frame post 24 by a pin 62. A grip 64 is mounted on the end of the handle 60. When the handle 60 is turned down to the position shown in FIG. 4, a flat member 63 secured to the handle extends over the struts 14 and 16 locking the struts in the position shown in FIG. 4, and holding the wheels 10 and 12 in their stowed position. The flat member 63 may be used to support a scorecard or the like when the golf cart is in use, and when the handle 60 is in the position shown in FIG. 5. The grip 64 is held in its position of FIG. 4 to lock the wheels 10 and 12 in their stowed position by means of a rotary clasp 25 mounted in the frame post 24.

Figure 6:
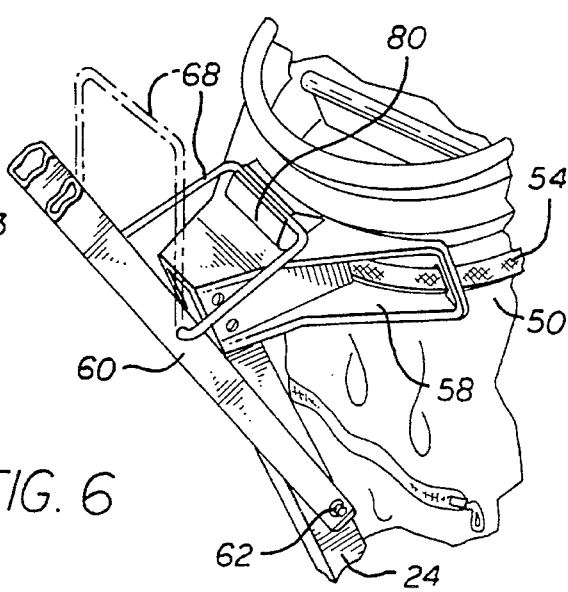
FIG. 6 is a fragmentary view taken along the line 6 in FIG. 5.

When the clasp 25 is released, the handle 60 may be turned up to its position of FIG. 5, and the wheels 10 and 12 may then be deployed in the manner described in conjunction with FIGS. 1-3. The handle 60 is held in its turned-up position of FIG. 5 by a U-shaped latch 68 which is pivotally mounted on the handle, and which is releasably held in a slotted member 69 affixed to the upper bracket 58, as best shown in FIG. 6.

As described, to deploy the wheels 10 and 12 from their stowed position of FIG. 4 to their deployed position of FIG. 5, wheel 10 is first turned manually about the path shown by the arrows in FIG. 1, as its strut 14 turns hinge 20 about the axis A-A. Then strut 16 is turned manually along the path shown by the arrows in FIG. 2, as it turns hinge 22 about axis B-B in FIG. 3.

Figure 7:
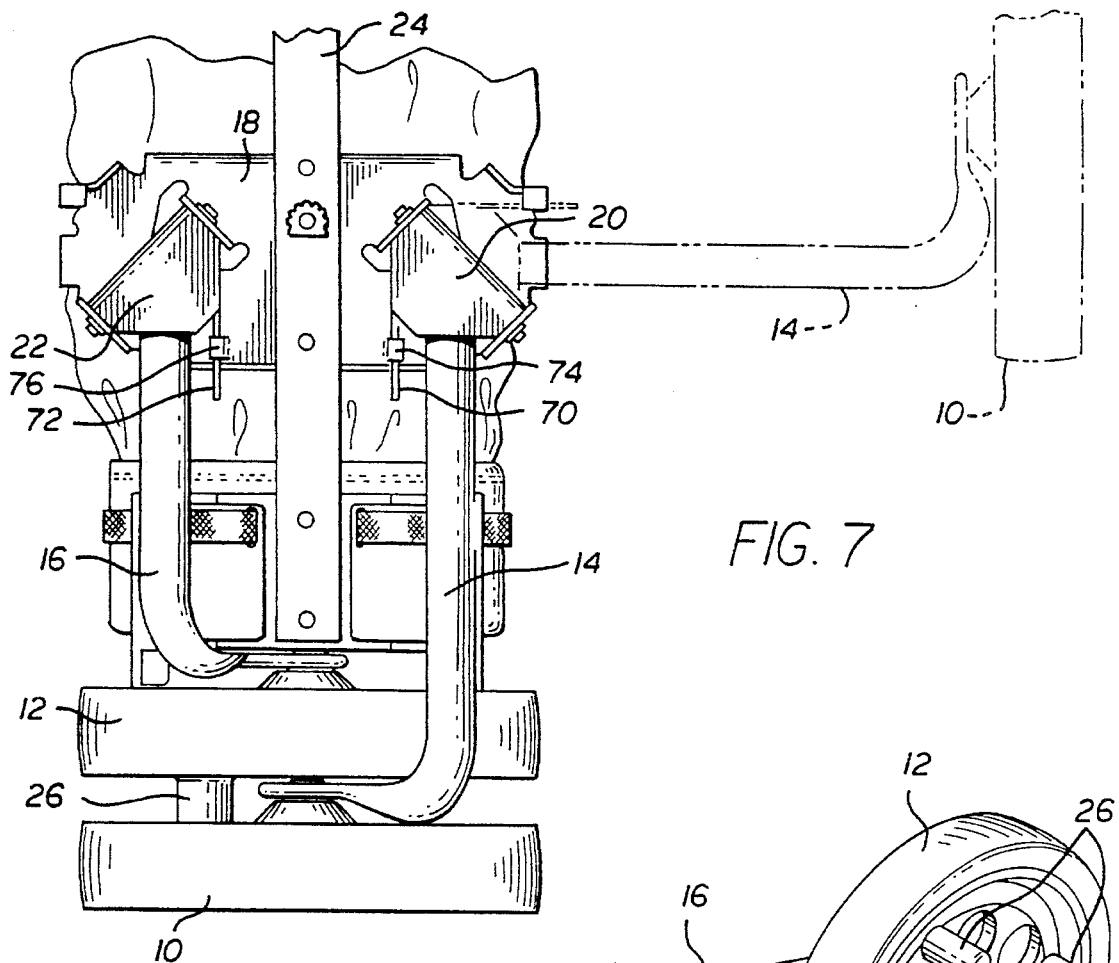
FIG. 7 is a detailed fragmentary view on an enlarged scale showing an elevation of the golf cart, taken from the rear and lower end of the representation of FIG. 4, and with certain elements removed for clarity purposes.
Figure 9:
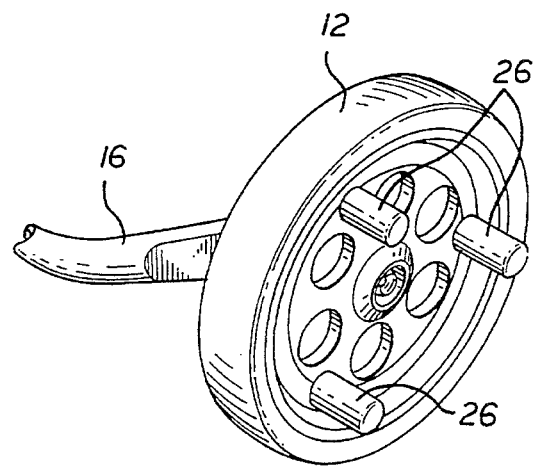
FIG. 9 is a perspective view of one of the wheels of the pull cart of the first embodiment, and showing certain stub shafts which serve to maintain the wheels separated from one another when in their collapsed position of FIGS. 4 and 7.
Figure 8:
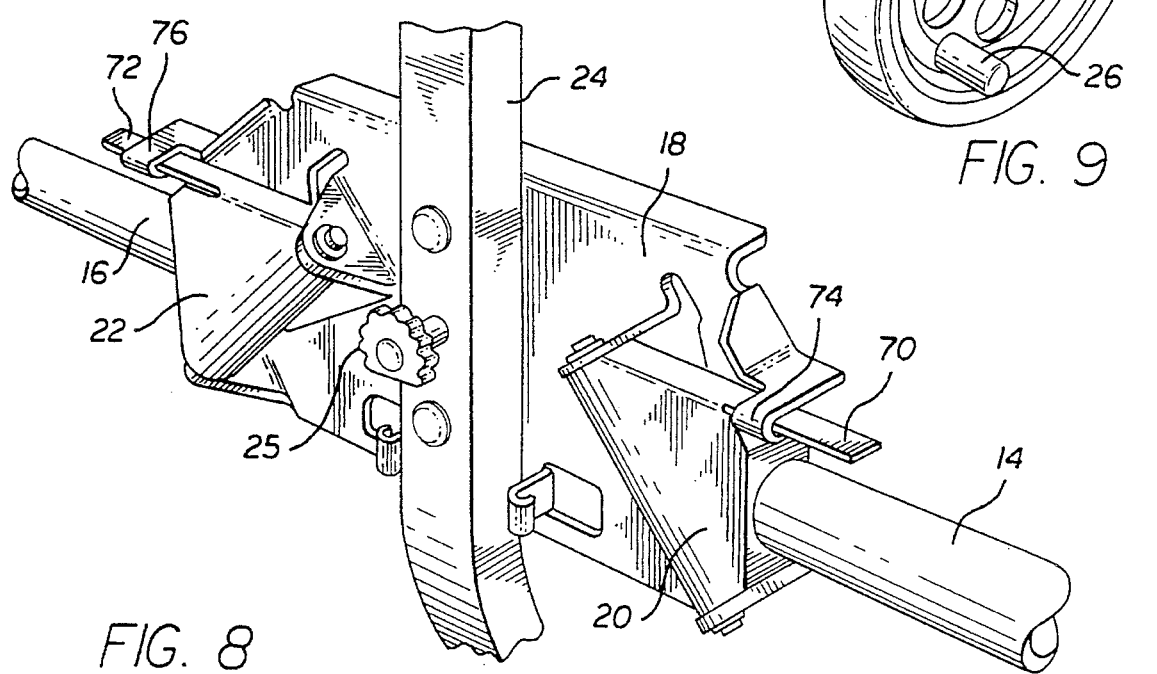
FIG. 8 is a fragmentary view like FIG. 7, and also with certain elements removed to illustrate certain components, the view of FIG. 8 representing the pull cart in its deployed and operating position, whereas the view of FIG. 7 represents the pull cart in its folded position.

As best shown in FIGS. 7 and 8, hinges 20 and 22 have respective resilient strips 70, 72 secured to them, and these strips releasably engage corresponding latches 74, 76 formed on bracket 18 when the wheels are deployed to the position of FIG. 5. The latches may be released by depressing the ends of strips 70 and 72 downwardly. Accordingly, the pull cart of FIGS. 3-8 may be transformed from its folded position of FIG. 4 to its deployed position of FIG. 5 merely by releasing handle 60 and turning it to its upper position of FIG. 5, and causing it to be latched by latch 68 to member 80. Then, the wheels 10 and 12 are turned sequentially to their deployed positions, and are automatically latched in those positions by the latches 70, 74 and 72, 76. To return the pull cart to its folded position of FIG. 4, the strips 70 and 72 are depressed and released, then wheel 12 and wheel 10 are sequentially returned to their folded position of FIG. 4. Latch 68 is then released and handle 60 is turned down to its position of FIG. 4, and the clasp 25 is turned to its locking position to lock the handle in its down position, and also to lock the wheels 10 and 12 in their stowed position.

A more simplified embodiment of the invention is shown in FIGS. 10 and 11. The second embodiment is generally similar to the first embodiment, and like elements have been designated by the same numbers. In the second embodiment the pivotal handle 60 has been replaced by a handle 60A which is attached to the frame post 24. The second embodiment includes an upper bracket 58A of a similar configuration to the upper bracket 58 in the previous embodiment, and which is adapted to receive an upper strap for holding the bag in place on the lower platform 52. The operation of the embodiment of FIGS. 10 and 11 is generally similar to the operation of the previous embodiment described above.

In the embodiment of FIGS. 12 and 13, the pull cart is built directly into a specially-designed golf bag 100, and the wheels 10 and 12 are stowed in the lower end of the bag 100 flush with the bottom. The bottom of the bag 100 is inclined to receive the wheels 10 and 12 in their stowed position, so that the entire assembly is substantially the same length as the bag 100. The bag 100 is designed so that the longer clubs are stored in the front and the shorter clubs in the rear, so that the overall length of the bag remains the same as a standard golf bag. In the latter embodiment, the grip 64 is mounted directly on the end of the handle, and the additional handle used in the previous embodiments is dispensed with. Handle 24 is slidable in bag 100, and its lower end protrudes from the bag (FIG. 12) when the assembly is folded to provide a ground contact and support.

The invention provides, therefore, an improved foldable golf pull cart which may be used in conjunction with a conventional golf bag, or made integral with a specially-designed golf bag, as described above.

The pull cart of the invention constitutes a significant improvement over existing pull carts because of its simplicity, and due to the fact that its wheels may be folded to a stowed position in axial alignment with the golf bag and directly under the golf bag, this being achieved by the provision of a single hinging axis, with both wheels, when stowed, being co-linear with the upright longitudinal axis of the golf bag. Moreover, in their folded, stowed state, the wheels lie in parallel planes, which in turn are parallel to the base of the golf bag, and the wheels fit under the platform which supports the golf bag on the cart.

The wheels of the pull cart of the invention may be simply and easily deployed to their operating position by sequentially rotating each of the strut and wheel assemblies through substantially 180 degrees to its deployed position at which it becomes automatically latched.

As described above, the pull cart of the invention is constructed so that all of its components fit essentially within the confines of the golf bag itself to form a compact package This is contrary to the usual prior art pull cart which relies on multi-bar linkages to deploy and fold its wheel assemblies, and in which the wheels usually fold up alongside the golf bag. The foregoing results in a bulky and cumbersome configuration of the prior art bag and cart assembly.

The pull cart of the invention is advantageous in that the bag and cart assembly may be stored in the trunk of a car, for example, without requiring the storage space required by the prior art assemblies. Moreover, when riding in an electric golf cart, the golfer need not remove the pull cart of the invention from the bag in order to facilitate fitting the bag into the space allotted on the electric golf cart. Accordingly, the transportation of the golf bag from the golfer's car to the electric golf cart is facilitated.

The pull cart of the invention also has a feature in that it is self-standing when its wheels are in its folded positions, and this represents an added advantage over the usual prior art pull carts. Additionally, the pull cart of the invention is constructed so that it can be readily carried by the shoulder strap of the golf bag without interference from the cart elements.

While particular embodiments of the invention have been shown and described, modifications may be made, and it is intended in the following claims to cover all such modifications which fall within the true spirit and scope of the invention.

I claim:

1. A two-wheeled golf pull cart including a frame for supporting a golf bag; and a retractable wheeled undercarriage mounted on said frame having first and second wheels and first and second struts respectively coupling the wheels to the frame so that the wheels may be individually movable between a spread-apart deployed operating position and a folded position in which the wheels are stowed one over the other underneath the golf bag and in co-linear relationship with the longitudinal axis of the golf bag, and said undercarriage further including first and second hinges respectively coupling the first and second struts to said frame to enable the wheels to be sequentially moved between their deployed and stowed positions along paths determined by said hinges as said struts are individually rotated about respective linear axes.

2. The two-wheeled golf pull cart defined in claim 1, and which includes a platform for said golf bag mounted on the lower end of said frame, and a bracket for receiving a securing strap for said golf bag mounted on the upper end of said frame.

3. The two-wheeled golf pull cart defined in claim 2, and which includes a foot member secured to said platform and depending downwardly therefrom to permit said golf bag to be supported in a stable upright position when the wheels are in their stowed positions.

4. The two-wheeled golf pull cart defined in claim 2, and in which said wheels are stowed parallel to one another under said platform and parallel thereto.

5. The two-wheeled golf pull cart defined in claim 1, and which includes a mounting bracket secured to said frame on which said first and second hinges are mounted adjacent to one another.

6. The two-wheeled golf pull cart defined in claim 5, and which includes releasable latching means mounted on said mounting bracket and on respective ones of said hinges for automatically latching said wheels in their deployed position.

7. The two-wheeled golf pull cart defined in claim 2, and which includes an elongated handle pivotally mounted to said frame and angularly movable between an extended position and a folded-over position with respect to said frame.

8. The two-wheeled golf pull cart defined in claim 7, and which includes a latching member pivotally coupled to said handle for releasably engaging said bracket to hold said handle in its extended position.

9. The two-wheeled golf pull cart defined in claim 8, and which includes a transverse member secured to said handle, and a clasp mounted on said frame in position to releasably engage said transverse member to lock said handle in its folded-over position.

10. The two-wheeled golf pull cart defined in claim 9, and which includes a member mounted on said handle in position to engage said struts when said wheels are in their stowed position and when said handle is in its folded-over position to lock the wheels in their stowed position.

11. The two-wheeled golf pull cart defined in claim 1, in which said golf pull cart is formed as an integral structure with said golf bag.

12. The two-wheeled golf pull cart defined in claim 11, in which said golf bag has an inclined bottom to form a recess for receiving said wheels.

* * * * *